United States Patent
Hermann et al.

(10) Patent No.: US 8,367,233 B2
(45) Date of Patent: Feb. 5, 2013

(54) BATTERY PACK ENCLOSURE WITH CONTROLLED THERMAL RUNAWAY RELEASE SYSTEM

(75) Inventors: Weston Arthur Hermann, Palo Alto, CA (US); Alex Prilutsky, San Mateo, CA (US); Vineet Haresh Mehta, Mountain View, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/585,996

(22) Filed: Aug. 15, 2012

(65) Prior Publication Data

US 2012/0308858 A1 Dec. 6, 2012

Related U.S. Application Data

(60) Division of application No. 12/798,198, filed on Mar. 30, 2010, now Pat. No. 8,277,965, which is a continuation-in-part of application No. 12/386,684, filed on Apr. 22, 2009.

(51) Int. Cl.
*H01M 2/12* (2006.01)
*H01M 2/02* (2006.01)
*H01M 10/50* (2006.01)

(52) U.S. Cl. ............ 429/82; 429/62; 429/159; 429/163; 429/185

(58) Field of Classification Search .................... 429/82, 429/87, 53, 56, 175, 176, 162, 62, 163, 159, 429/185; 523/179; 29/623.1
See application file for complete search history.

(56) References Cited

U.S. PATENT DOCUMENTS

| | | |
|---|---|---|
| 2,094,329 A | 9/1937 | Mascuch |
| 3,166,446 A | 1/1965 | Hutchison |
| 3,201,284 A | 8/1965 | Ellis |
| 3,834,945 A | 9/1974 | Jensen |
| 4,482,613 A | 11/1984 | Turchan et al. |
| 4,804,593 A | 2/1989 | Hara et al. |
| 5,042,675 A * | 8/1991 | Patterson ............... 220/89.1 |
| 5,508,321 A * | 4/1996 | Brebner ................... 523/179 |
| 6,964,690 B2 * | 11/2005 | Goda et al. ............. 29/623.1 |
| 2003/0070706 A1 | 4/2003 | Fujioka |
| 2005/0029986 A1 | 2/2005 | Morgan |
| 2005/0069759 A1* | 3/2005 | Shimamura et al. ........ 429/53 |
| 2005/0147874 A1* | 7/2005 | Andersen et al. .......... 429/87 |
| 2005/0170238 A1* | 8/2005 | Abu-Isa et al. ............ 429/82 |
| 2006/0068278 A1 | 3/2006 | Bloom et al. |
| 2007/0298314 A1* | 12/2007 | Partin et al. .............. 429/62 |
| 2008/0050645 A1 | 2/2008 | Kai et al. |
| 2008/0220321 A1 | 9/2008 | Yonemochi et al. |
| 2008/0318121 A1 | 12/2008 | Takagi |
| 2009/0220850 A1 | 9/2009 | Bitsche et al. |
| 2010/0183910 A1 | 7/2010 | Nishino et al. |

FOREIGN PATENT DOCUMENTS

| | | |
|---|---|---|
| JP | 2004039358 A | 2/2004 |
| JP | 2009054303 A | 3/2009 |
| WO | WO 2005122294 A1 | 12/2005 |

* cited by examiner

*Primary Examiner* — Basia Ridley
*Assistant Examiner* — Kenneth Douyette
(74) *Attorney, Agent, or Firm* — Patent Law Offices of David G. Beck

(57) ABSTRACT

A battery pack thermal management system is provided that is comprised of at least one enclosure failure port integrated into at least one wall of a battery pack enclosure, where the enclosure failure port(s) remains closed during normal operation of the battery pack, and opens during a battery pack thermal runaway event, thereby providing a flow path for hot gas generated during the thermal runaway event to be exhausted out of the battery pack enclosure in a controlled fashion.

18 Claims, 9 Drawing Sheets

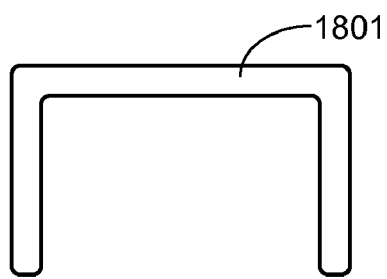
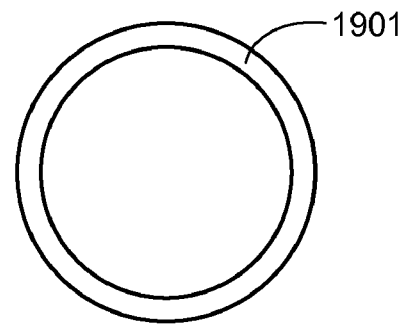
FIG. 18  FIG. 19
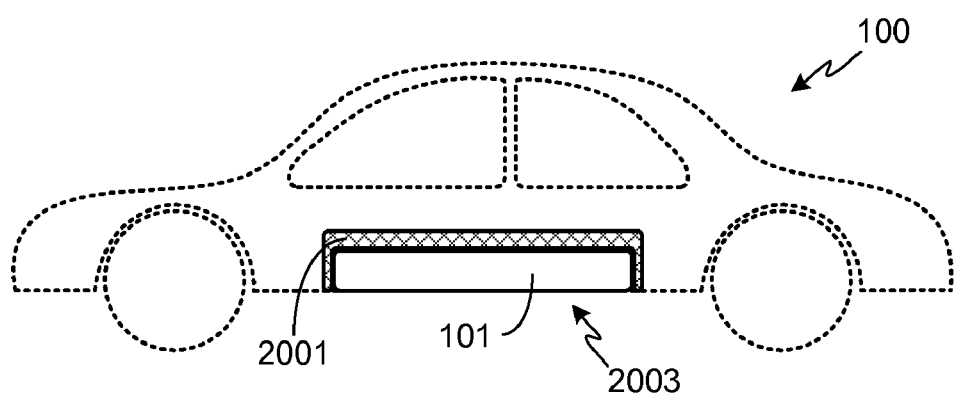
FIG. 20

BATTERY PACK ENCLOSURE WITH CONTROLLED THERMAL RUNAWAY RELEASE SYSTEM

CROSS-REFERENCE TO RELATED APPLICATION

The present application is a divisional of U.S. patent application Ser. No. 12/798,198, filed 30 Mar. 2010, now U.S. Pat. No. 8,277,965, which is a continuation-in-part of U.S. patent application Ser. No. 12/386,684, filed Apr. 22, 2009, the disclosures of which are incorporated herein by reference for any and all purposes.

FIELD OF THE INVENTION

The present invention relates generally to battery packs and, more particularly, to a system for controlling the release of thermal energy and hot gas from a battery pack undergoing thermal runaway.

BACKGROUND OF THE INVENTION

There is currently a trend in the automotive industry to replace combustion engines with electric motors or a combination of an electric motor and a combustion engine, thereby substantially reducing the environmental impact of automobiles by reducing (i.e., hybrids) or completely eliminating (i.e., electric vehicles) car emissions. This switch in drive train technology is not, however, without its technological hurdles as the use of an electric motor translates to the need for inexpensive batteries with high energy densities, long operating lifetimes, and operable in a wide range of conditions. Additionally, it is imperative that the battery pack of a vehicle pose no undue health threats, either during vehicle use or during periods of storage.

While current rechargeable battery technology is able to meet the demands of the automotive industry, the relatively unstable nature of the chemistries used in such batteries often leads to specialized handling and operating requirements. For example, rechargeable batteries such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures. In the case of a battery pack used in an electric vehicle, a severe car crash may simultaneously send multiple cells within the battery pack into thermal runaway.

During a thermal runaway event, a large amount of thermal energy is rapidly released, heating the entire cell up to a temperature of 850° C. or more. Due to the increased temperature of the cell undergoing thermal runaway, the temperature of adjacent cells within the battery pack will also increase. If the temperature of these adjacent cells is allowed to increase unimpeded, they may also enter into a state of thermal runaway, leading to a cascading effect where the initiation of thermal runaway within a single cell propagates throughout the entire battery pack. As a result, power from the battery pack is interrupted and the system employing the battery pack is more likely to incur extensive collateral damage due to the scale of thermal runaway and the associated release of thermal energy.

A number of approaches have been employed to either reduce the risk of thermal runaway, or reduce the risk of thermal runaway propagation. For example, by insulating the battery terminals and using specifically designed battery storage containers, the risk of shorting during storage and/or handling can be reduced. Another approach is to develop new cell chemistries and/or modify existing cell chemistries. Yet another approach, disclosed in co-pending U.S. patent application Ser. Nos. 12/504,712, 12/460,372, 12/460,342, 12/460,423 and 12/460,346, is to provide additional shielding at the cell level, thus inhibiting the flow of thermal energy from the cell undergoing thermal runaway to adjacent cells. Still yet another approach, disclosed in co-pending U.S. patent application Ser. No. 12/545,146, is to use a spacer assembly to maintain the position of the battery undergoing thermal runaway in its predetermined location within the battery pack, thereby helping to minimize the thermal effects on adjacent cells.

While a number of approaches have been adopted to try to lower the risk of thermal runaway as well as its propagation throughout the battery pack, it is critical that if a pack-level thermal runaway event does occur, personal and property risks are minimized. Accordingly, what is needed is a system that controls the flow of the thermal energy and hot gas created during a cascading thermal runaway event. The present invention provides such a system.

SUMMARY OF THE INVENTION

A battery pack thermal management system is provided that is comprised of an enclosure failure port assembly integrated into a wall of a battery pack enclosure, where the enclosure failure port assembly remains closed during normal operation of the battery pack, and opens during a battery pack thermal runaway event, thereby providing a flow path for hot gas generated during the thermal runaway event to be exhausted out of the battery pack enclosure. The failure port assembly is comprised of a region of the enclosure wall that is thinner than the surrounding wall, where a portion of the perimeter of the region is thicker than a second portion of the perimeter so that the second portion will fail before the first portion. The battery pack enclosure may be comprised of a material with a melting temperature greater than 800° C.; comprised of a material with a melting temperature greater than 1000° C.; comprised of a material that includes an outer layer and an inner ceramic layer, for example where the inner ceramic layer prevents the outer layer from melting during the battery pack thermal runaway event; and/or comprised of a material that includes an outer layer and an inner intumescent layer, for example where the inner intumescent layer prevents the outer layer from melting during the battery pack thermal runaway event. Further, the battery pack enclosure may be comprised of first and second housing members with means to secure the two housing members together; and comprised of first and second housing members with means to secure the two housing members together and with a sealing gasket configured to be interposed between the sealing surfaces of the first and second housing members. In at least one configuration, the system also includes a heat resistant channel, such as an open or closed channel, that directs the flow of hot gas exhausted through the enclosure failure port during a thermal runaway event, for example directing the flow away from a vehicle passenger compartment. In at least one configuration, the system also includes at least one layer of a thermal insulator positioned between the battery pack enclosure and a vehicle passenger compartment. In at least one configuration, the system also includes at least one layer of a fire retardant material (e.g., an intumescent material) positioned between the battery pack enclosure and a vehicle passenger compartment.

A further understanding of the nature and advantages of the present invention may be realized by reference to the remaining portions of the specification and the drawings.

BRIEF DESCRIPTION OF THE DRAWINGS

FIG. 18 is a cross-sectional view of an open channel for use with the embodiment illustrated in FIG. 17;

FIG. 19 is a cross-sectional view of a closed channel for use with the embodiment illustrated in FIG. 17;

FIG. 20 illustrates an embodiment utilizing thermal insulation to reduce the flow of thermal energy from the battery pack enclosure to adjacent vehicle regions.

DESCRIPTION OF THE SPECIFIC EMBODIMENTS

Figure 1:
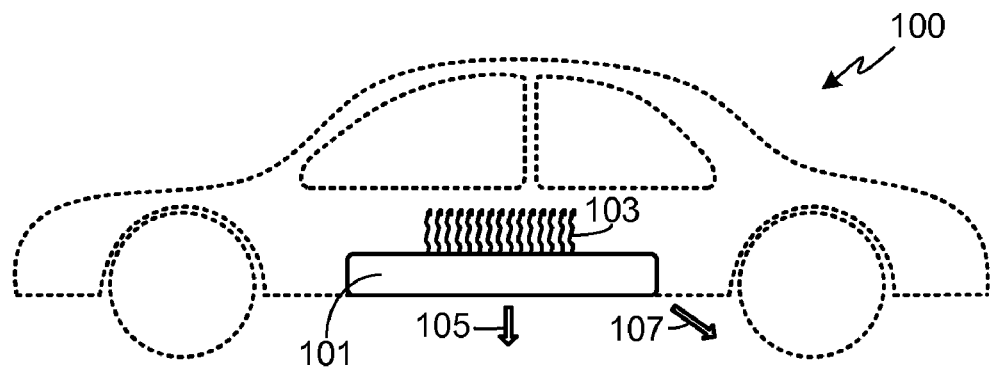
FIG. 1 provides a side view of a battery pack mounted under a car.

In the following text, the terms "battery", "cell", and "battery cell" may be used interchangeably and may refer to any of a variety of different rechargeable cell chemistries and configurations including, but not limited to, lithium-ion (e.g., lithium iron phosphate, lithium cobalt oxide, other lithium metal oxides, etc.), lithium-ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to either an all electric vehicle, also referred to as an EV, plug-in hybrid vehicles, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

The rechargeable batteries used in an electric vehicle (e.g., EV, PHEV, HEV) store a significant amount of energy. The amount of energy per cell and the total amount of energy stored per battery pack depends upon the type of cell and the number of cells within the pack. For example, lithium-ion cells with an 18650 form factor store approximately 30 kJ of thermal energy when completely charged, and therefore a battery pack with 8000 cells stores up to approximately 240 MJ of thermal energy, depending upon the state of charge of the individual cells within the pack. When a cell within such a battery pack undergoes thermal runaway, it releases its thermal energy, some of which is in the form of hot gas (e.g., approximately 5 liters of hot gas for a lithium-ion 18650 cell). These jets of hot gas, in combination with the heat generated during such an event, may cause adjacent cells to enter into thermal runaway. Therefore if the initial thermal runaway event is not effectively managed, more and more cells will enter into thermal runaway until eventually all of the cells within the battery pack may be consumed.

While it is clearly desirable to quickly detect a cell undergoing the first stages of thermal runaway and then manage the event before it can propagate throughout the battery pack, preferably precautions are also taken to limit the risk to the vehicle's passengers and, to the extent possible, limit collateral property damage in the case that the event is not quickly extinguished. Such precautions are especially important given the amount of thermal energy, hot gas, and smoke that may be released if the event propagates throughout the battery pack. The purpose of the present invention is the control of the thermal energy, hot gas and smoke released during such an event.

Figure 2:
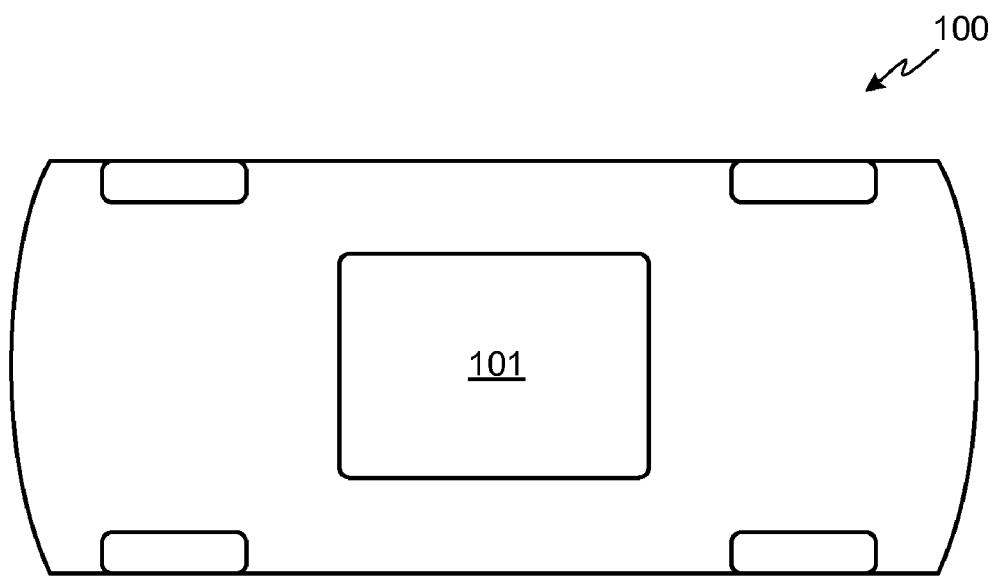
FIG. 2 provides a bottom view of the battery pack of FIG. 1.

FIGS. 1 and 2 provide side and bottom views, respectively, of a car 100 with a battery pack 101 mounted underneath the car. It should be understood that the battery pack configuration shown in FIGS. 1 and 2 is simply for illustration purposes and that the invention is equally applicable to other configurations. In general, the location of the battery pack is based on a number of design criteria including, but not limited to, battery pack size and weight to achieve the desired performance, cell choice, distribution of the battery pack weight to achieve the desired vehicle performance, constraints due to vehicle size, location of vehicle undercarriage support frame members, passenger compartment size and configuration (e.g., number of seats), configuration of the trunk and engine compartments, etc. Additionally it should be understood that in some vehicles multiple battery packs may be used. The use of a multiple pack design may be due to the use of multiple drive motors, or simply as a means of achieving the desired weight distribution.

Given that a typical mounting location for a vehicle's battery pack is underneath the car, and often at least partially under or behind the passenger compartment, management of the flow of hot gas and smoke as well as the containment of thermal energy released during a propagating thermal runaway event is critical to the safety of the passengers. As the contents of a battery pack undergoing thermal runaway may reach temperatures of 850° C. or greater, one aspect of the present invention is to minimize the amount of thermal energy passing directly into the passenger compartment from the battery pack, for example along pathway 103 in the exemplary configuration shown in FIGS. 1 and 2. Additionally, as a large amount of smoke is generated during such a thermal event due to the combustion of various battery and battery pack materials, another goal of the present invention is to direct the flow of hot gas and smoke away from the egress points, thus insuring that the vehicle's passengers can safely exit the car.

Figure 3:
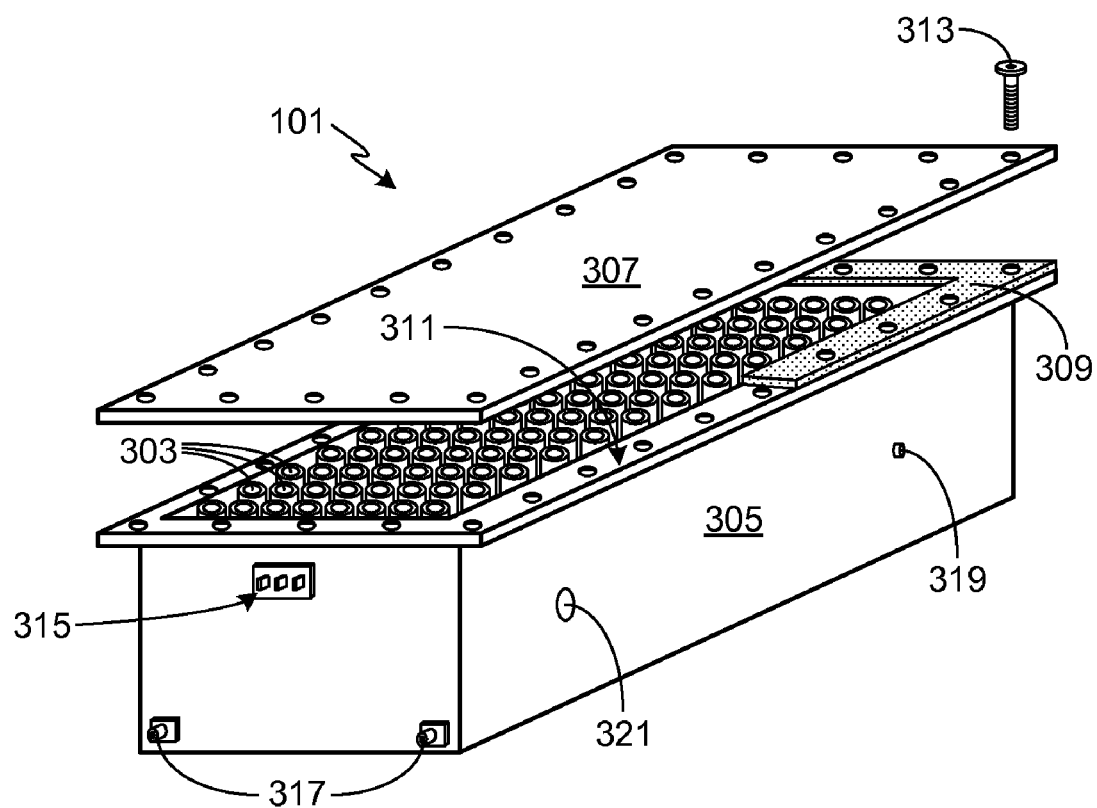
FIG. 3 is a perspective view of a preferred embodiment of a battery pack enclosure.

FIG. 3 is a perspective view of a preferred embodiment of a battery pack enclosure 101 fabricated in accordance with the invention. Many features of this enclosure are described in detail in co-pending U.S. patent application Ser. No. 12/386,684, filed Apr. 22, 2009, the disclosure of which is incorporated herein by reference for any and all purposes. It will be appreciated that the size and shape of the enclosure are based on the design criteria of the vehicle and that enclosure 101 is meant to simply illustrate the invention, not limit its application.

As shown in FIG. 3, a plurality of individual batteries 303 are mounted within a multi-piece enclosure that is designed to withstand the high temperatures associated with a propagating thermal runaway event. As such, enclosure 101 is preferably fabricated from steel or a similar metal that has a melting point of greater than 800° C., more preferably greater than 1000° C., and still more preferably greater than 1200° C. Alternately, enclosure 101 may be fabricated from a lower melting point material, i.e., a material with a melting point less than 800° C., but with an inner liner comprised of a material that prevents the outer enclosure wall from melting during the thermal runaway event. For example, enclosure 101 may be comprised of an outer layer of aluminum, and coated on the enclosure's interior surface with a thermal insulator (e.g., a ceramic such as a carbide, nitride or silicide, or an intumescent material) that prevents the temperature of the outer layer from exceeding its melting point.

Enclosure 101 is comprised of a lower housing member 305 and a lid or upper housing member 307. As the invention is not limited to a specific battery chemistry, geometry, specific number of cells or battery interconnect configuration, further details regarding such are not provided herein.

As noted above, during a thermal runaway event hot gas is expelled by the cells undergoing thermal runaway. Accordingly, it is important that enclosure 101 not allow the hot gas to escape the enclosure, except in the preconfigured region or regions as described below (i.e., the failure points designed into the enclosure). Therefore the walls of the enclosure are preferably welded together, assuming the enclosure walls are fabricated from a weldable material. Other fabrication means may also be used, such as riveting, as long as the enclosure is able to maintain its shape during a thermal event and does not permit hot gas and/or flammable material to escape the enclosure along an undesired path (e.g., into the passenger compartment). It will be appreciated that the wall thickness for the enclosure is determined on the basis of the selected material, the dimensions of the enclosure, and the size and weight of the cells to be housed within the enclosure.

In order to prevent the escape of hot gas and/or flammable material in undesired locations, preferably a compressible seal 309 is interposed between the complimentary and mating surfaces of lower housing member 305 and upper housing member 307. Seal 309 may be fabricated from a variety of different materials, although metal sealing gaskets are preferred due to the high temperatures encountered during a thermal event.

Preferably lower housing member 305 includes a flange 311 onto which the sealing gasket, if used, is positioned. In the illustrated embodiment, upper housing member 307 is flat, however, in embodiments in which a non-flat upper housing member is used, the upper housing member preferably also includes a flange that is complimentary to flange 311. Enclosure 101 includes means, for example a plurality of bolts 313, for compressing seal 309 and holding together the housing members. Bolts 313 may also be used to attach enclosure 101 to the mounting structure or mounting bay of the electric or hybrid vehicle.

It will be appreciated that enclosure 101 requires the inclusion of various couplings that pass through one or more walls of the enclosure. For example, the enclosure requires a plurality of electrical connectors 315 that allow connection to be made to the cells within the pack. Electrical connectors are also required for coupling to any sensors maintained within the enclosure, for example temperature sensors. Additionally, assuming the use of an active battery cooling system, the enclosure may also include coolant line connectors 317.

During a propagating thermal event, due to the high temperature and the increased pressure, enclosure connectors are prone to failure. Failure, in this sense, does not refer to the connectors no longer functioning as intended, i.e., no longer passing electrical power from the battery pack (i.e., connectors 315) or coolant for the battery cooling system (i.e., connectors 317). Rather, failure in this sense refers to the connectors providing a path for hot gas and flammable materials to pass out of the battery pack enclosure. In at least one embodiment of the invention, connector failure is intended and the connectors are located to insure that the hot gas and material are exhausted out of the enclosure in the desired locations as described further below. Alternately, the connectors can be designed to withstand the temperature and pressure of a propagating thermal runaway event. In this embodiment, preferably electrical connectors 315 utilize a combination of a high temperature ceramic as the insulator, and a high melting point metal for the conductors. In this same embodiment, preferably metal coolant connectors 317 are used, along with metal coolant lines, thus preventing the connectors from becoming unintended enclosure failure points during a thermal event.

Pressure differentials between the inner volume of the enclosure and the outside environment may be caused by the battery pack being moved to a different altitude, and thus subjected to a different external pressure. Pressure differentials can also arise due to component out-gassing, battery cell venting, temperature changes, etc. As enclosure 101 is designed to contain a propagating thermal runaway event, and to direct generated hot gas and flammable materials through pre-configured failure points, it has sufficient structural strength and rigidity to tolerate ordinary pressure differentials. Alternately, in at least one embodiment, a pressure management system is used to ensure that the pressure differential between the inner volume of the enclosure and the outside environment stays within a predetermined range during normal battery pack operation. Preferably the pressure management system is comprised of one or more pressure relief valves 319 coupled to enclosure 101. Preferably pressure relief valve or valves 319 are two-way valves. If the enclosure utilizes pressure a relief valve, preferably the pressure relief valve or valves are used not only as a means of maintaining the pressure within the enclosure within the desired operating range during normal battery pack operation, but also as enclosure failure points that are intended to allow hot gas to exit the enclosure during a thermal runaway event. In such an embodiment, either the pressure relief valves are designed to allow sufficient gas to pass through during a thermal runaway event to prevent catastrophic over-pressurization of the enclosure, or other enclosure failure mechanisms are incorporated into the enclosure as described below in addition to the pressure relief valve(s).

Figure 4:
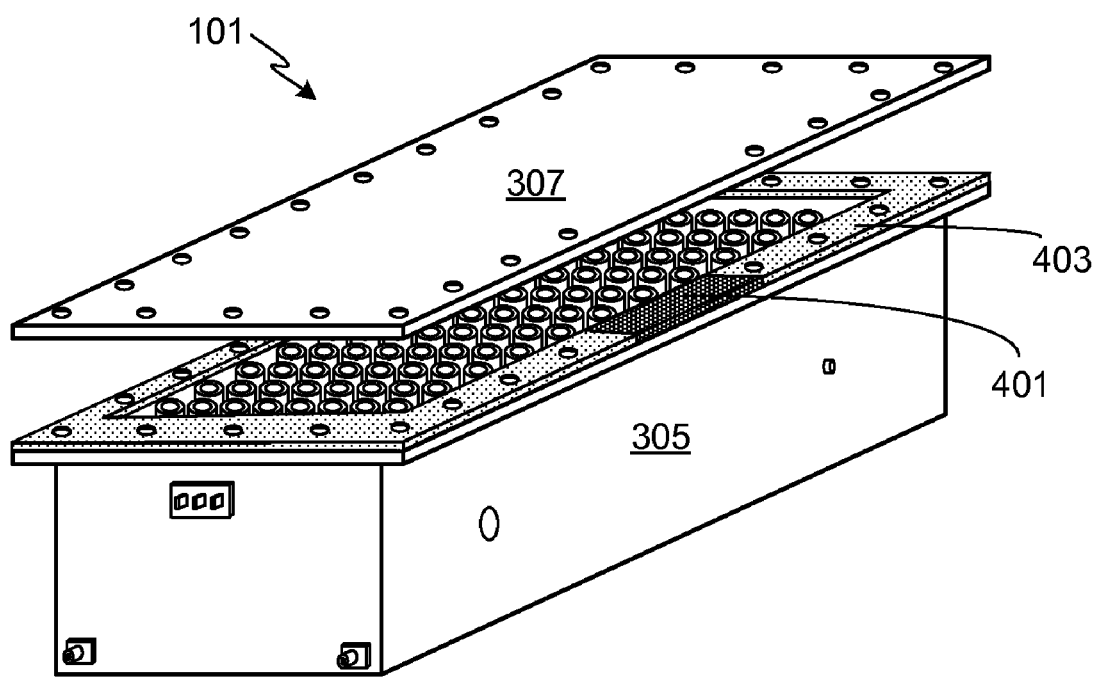
FIG. 4 is a perspective view of a preferred embodiment of a battery pack enclosure utilizing a multi-section enclosure gasket.
Figure 5:
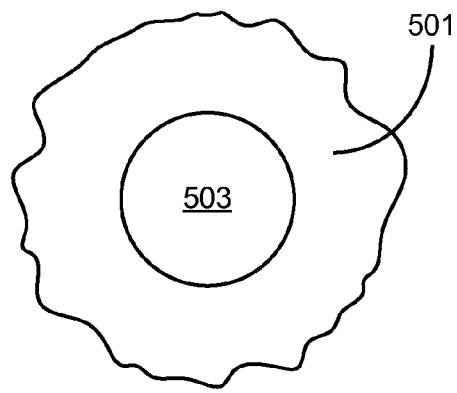
FIG. 5 is a side view of a portion of a battery pack enclosure illustrating an embodiment of an enclosure failure mechanism.
Figure 6:
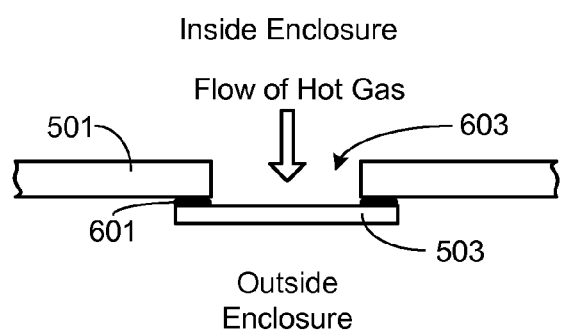
FIG. 6 is a cross-sectional view of the enclosure failure mechanism shown in FIG. 5.
Figure 7:
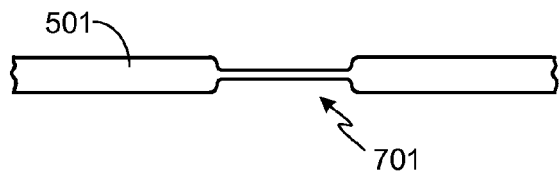
FIG. 7 is a cross-sectional view of an alternate enclosure failure mechanism using a thinned enclosure wall.
Figure 8:
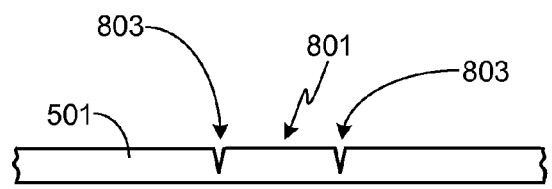
FIG. 8 is a cross-sectional view of an alternate enclosure failure mechanism using a scored enclosure wall.
Figure 9:
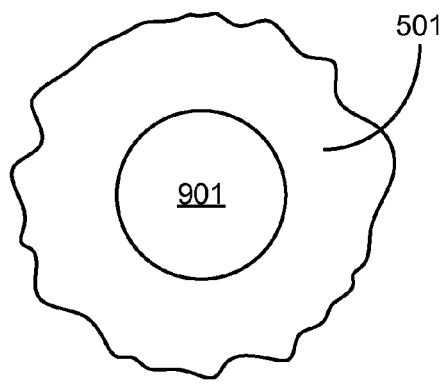
FIG. 9 is a side view of a portion of a battery pack enclosure illustrating an alternate embodiment of an enclosure failure mechanism.
Figure 10:
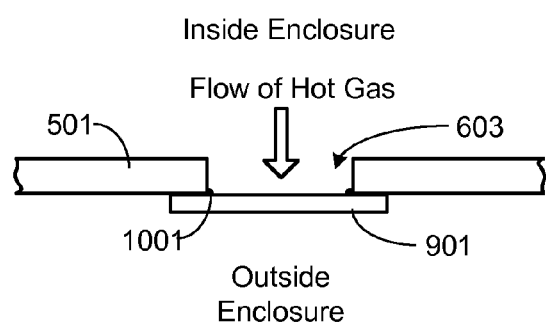
FIG. 10 is a cross-sectional view of the enclosure failure mechanism shown in FIG. 9.
Figure 11:
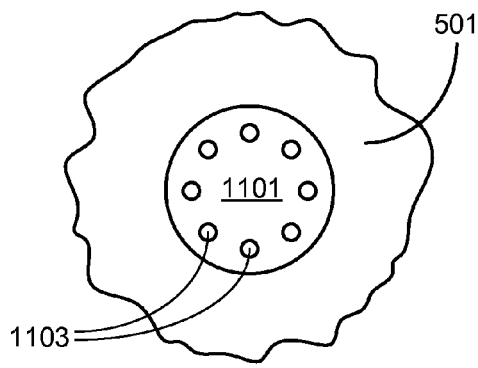
FIG. 11 is a side view of a portion of a battery pack enclosure illustrating an alternate embodiment of an enclosure failure mechanism.
Figure 12:
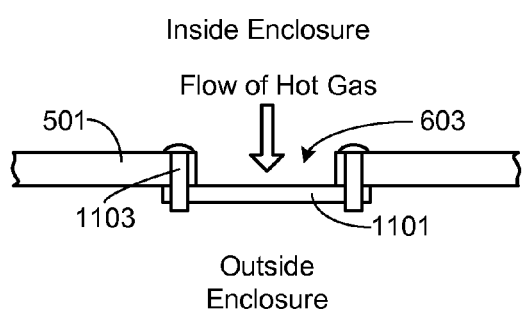
FIG. 12 is a cross-sectional view of the enclosure failure mechanism shown in FIG. 11.

As previously noted, the enclosure of the present invention is designed to control and direct the flow of hot gas and flammable materials during a propagating thermal runaway event using one or more enclosure failure ports 321, the enclosure failure port(s) preferably directing the flow of hot gas and flammable materials away from the passenger compartment as well as the passenger compartment egress points (e.g., doors, windows). FIG. 4 illustrates one type of enclosure failure port. In this embodiment, a portion 401 of enclosure sealing gasket 403 is designed to fail when the temperature and/or pressure exceeds the normal operating range of the battery enclosure, thus providing a port for exhausting hot gas from the enclosure. In this embodiment preferably the enclosure seal is comprised of multiple sections, e.g., sections 401 and 403 where section 401 is comprised of a material with a lower melting point than that of section 403. Note that region 401 of the enclosure gasket may be designed to mate to a channel as described relative to FIG. 17, thus allowing the flow of hot gas to be directed as desired. FIGS. 5 and 6 illustrate another type of enclosure failure port. In these figures, a portion 501 of a wall of enclosure 101 is shown. As illustrated, a cover 503 is sealed to enclosure wall 501 with a sealant 601, cover 503 covering a hole 603 within the enclosure wall. Cover 503 may be fabricated from the same material as the enclosure, or from a different material. Sealant 601 may be comprised of a bonding material, solder or another type of fastener. Seal 601 is selected to provide an adequate structural seal during normal battery pack usage, but to fail when subjected to a predetermined and abnormal temperature (e.g., greater than 250° C.; greater than 500° C.; etc.) and/or a predetermined and abnormal pressure (e.g., greater than 5 psi; greater than 10 psi; etc.). When seal 601 fails, cover 503 blows away from the enclosure wall, thus allowing the enclosure to vent the hot gas and flammable materials. FIG. 7 illustrates an alternate type of enclosure failure port. As shown in the cross-sectional view of FIG. 7, in this exemplary configuration enclosure wall 501 is sufficiently thinned at a region 701 that it will fail as the temperature and the pressure within the enclosure increases during the thermal event. FIG. 8 illustrates an alternate type of enclosure failure port. As shown in the cross-sectional view of FIG. 8, in this exemplary configuration a portion 801 of enclosure wall 501 is surrounded by scoring 803, thereby allowing portion 801 to fail along scoring 803 as the temperature and the pressure within the enclosure increases during the thermal event. FIGS. 9 and 10 illustrate an alternate enclosure failure port in which a cover 901, fabricated from a relatively low melting point material, is bonded, soldered, welded or otherwise fastened to enclosure wall 501, cover 901 covering hole 603 (also referred to herein as a port). Cover 901 may be fabricated from any of a variety of different materials that will melt, thereby opening port 603, when the temperature exceeds a predetermined temperature (e.g., greater than 250° C.; greater than 500° C.; etc.) and/or a predetermined pressure (e.g., greater than 5 psi; greater than 10 psi; etc.). Exemplary materials include metals and alloys, e.g., aluminum with a melting temperature of 659° C., and plastics, composites, etc. In the illustrated embodiment, cover 901 is attached to wall 501 at joint 1001. Note that this embodiment is similar to that shown in FIGS. 5 and 6, except that during a thermal runaway event, the cover fails as opposed to the cover seal. FIGS. 11 and 12 illustrate an alternate embodiment in which cover 1101 is held in place against enclosure wall 501 using a plurality of bolting members 1103 (e.g., bolts, rivets, etc.). In this embodiment, bolts/rivets 1103 are designed to fail as the temperature and pressure within enclosure 101 increase beyond normal.

Figure 13:
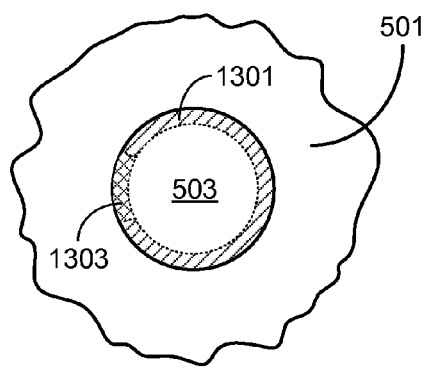
FIG. 13 illustrates a modification of the embodiment illustrated in FIG. 5, the modification directing the flow of hot gas and material out of the exhaust port.
Figure 14:
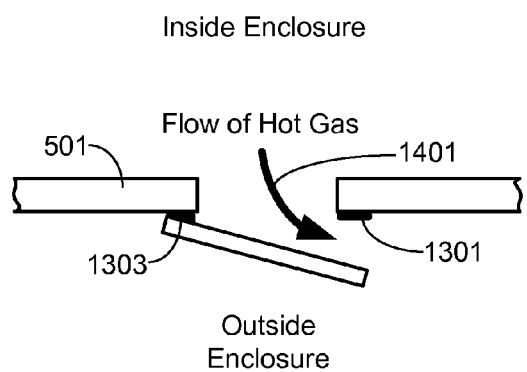
FIG. 14 is a cross-sectional view of the enclosure failure mechanism shown in FIG. 13.
Figure 15:
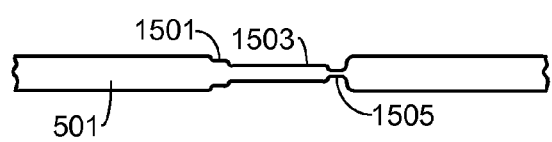
FIG. 15 illustrates a modification of the embodiment illustrated in FIG. 7, the modification directing the flow of hot gas and material out of the exhaust port.
Figure 16:
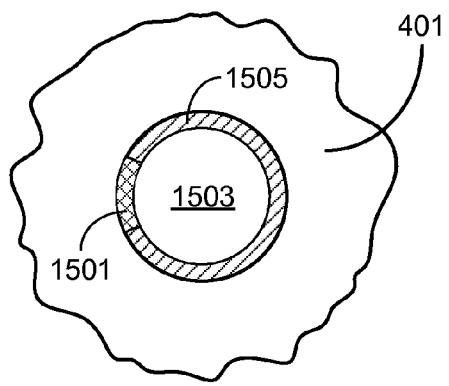
FIG. 16 illustrates an alternate view of the embodiment shown in FIG. 15.

The enclosure failure mechanisms described above are designed to fail completely during a major thermal runaway event. In a minor variation, the enclosure failure port is designed to guide the flow of hot gas and material exiting the enclosure during such an event. In general, the mechanisms described above may be used, except that the cover is held more firmly in one area than the remaining area. For example, the embodiment shown in FIGS. 5 and 6 may be modified as shown in FIGS. 13 and 14. In this configuration, two different materials are used for the seal, a first material 1301 along most of the cover/wall junction, and a second material 1303 along a small portion of the cover/wall junction. By using a material for seal 1303 with a higher melting point than that of material 1301, when the temperature and pressure within enclosure 101 gets high enough, seal 1301 gives away before seal 1303. As a result, hot gas and flammable material is directed along path 1401 as shown. Clearly the other enclosure failure systems may also be modified to achieve directed gas flow out of the enclosure upon failure. For example, the embodiment shown in FIG. 7 may be modified by increasing the thickness in a portion 1501 of the perimeter of cover 1503 relative to the remaining portion 1505 (FIGS. 15 and 16). When the temperature and pressure increases sufficiently, region 1505 breaks or melts first, allowing cover 1503 to bend along perimeter portion 1501. Similarly, the scoring 803 of the embodiment shown in FIG. 8 may have a variable depth, thereby allowing region 801 to open in a predetermined manner. The embodiment illustrated in FIGS. 9 and 10 may be modified by varying the thickness of cover 901 so that as the cover begins to melt, it preferentially melts, thereby creating a path for directing the escaping hot gas. The embodiment illustrated in FIGS. 11 and 12 may be modified by using bolts or rivets with different melting points, thus allowing the cover to break-away from enclosure 101 in a predictable fashion.

In accordance with the invention, the region of intended enclosure failure is located such that the hot gas and materials expelled from the enclosure are directed away from the passenger compartment, and preferably away from any location that might interfere with passengers leaving the vehicle or emergency aid coming to the assistance of the passengers. Additionally, it is preferred that the flow of hot gas and material be directed away from flammable materials, thus reducing the risk of the thermal runaway event leading to additional vehicle, or other, damage. An example of preferred flow directions is given in FIG. 1 in which hot gas and material is preferably exhausted from the enclosure in a direction 105 that directs the flow downwards towards the pavement under the car, or in a direction that directs the flow away from the vehicle, e.g., direction 107 that directs the flow downwards and backwards towards the pavement and the rear of the vehicle. Note that as the vehicle will likely be stopped during this process, an alternate preferred flow direction is downwards and forwards towards the pavement and the front of the vehicle. It will be appreciated that the desired flow direction depends upon the location of the battery pack enclosure relative to the passenger compartment, and the design of the passenger compartment itself. For example, if the battery pack enclosure is mounted under the car, and at the very rear of the car, one preferred flow direction would be towards the rear of the car, away from the passenger compartment and the vehicle itself. As used herein, and as noted above, enclosure connectors (e.g., electrical or coolant connectors), pressure relief valves, or dedicated failure mechanisms (e.g., as illustrated in the exemplary embodiments of FIGS. 4-16) may all be used to provide the desired battery pack enclosure failure port(s). Note that these enclosure failure ports may be designed to fail based only the internal pressure of the enclosure (i.e., over-pressure), based only on the internal temperature of the enclosure (i.e., over-temperature), or based on a combination of both as is preferred.

Figure 17:
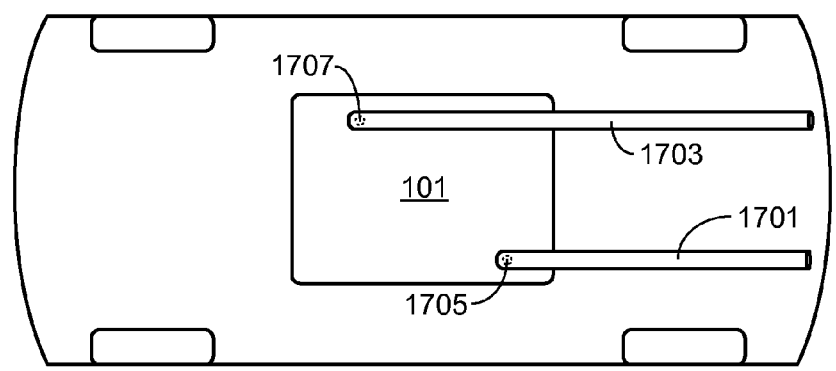
FIG. 17 illustrates an embodiment of the invention utilizing one or more heat resistant channels to direct the flow from the battery pack enclosure failure ports.

In at least one embodiment, in addition to providing enclosure failure ports, the ports are coupled to heat resistant channels that allow further direction of the flow of hot gas and material away from the passenger compartment regardless of the mounting location of the battery pack. By directing the flow of hot gas further from the passenger compartment, the likelihood of harming passengers or initiating vehicle fires is reduced. Additionally, by directing the flow of smoke, burning debris, etc. far away from the passenger compartment, passenger visibility is increased, as is passenger access to fresh air. FIG. 17 illustrates this aspect of the invention. As shown, a pair of heat resistant ducts 1701/1703 direct the flow of hot gas/debris from a pair of enclosure failure ports 1705/1707, respectively. It will be appreciated that this is simply an exemplary configuration, and that the invention may utilize a fewer or greater number of channels, and the channels may couple to the enclosure at different locations, and the channels may direct the flow in different directions than shown.

The heat resistant channels of this embodiment, e.g., channels 1701 and 1703, may either utilize an open design as illustrated by the cross-sectional view of channel 1801 in FIG. 18, or a closed design as illustrated by the cross-sectional view of channel 1901 in FIG. 19. If an open channel design is used, the open portion of the channel is oriented relative to the vehicle to direct the flow of hot gas and material away from the vehicle. Note that the heat resistant channels may be fabricated from any of a variety of materials that are intended for high temperature applications. For example, in one embodiment a metal conduit is used, for example a steel conduit. In another embodiment, a metal conduit is used with an outer or an inner high temperature insulator. In yet another embodiment, the heat resistant channel is comprised of inner and outer metal conduits with a thermally insulating material interposed between the two conduit layers.

In at least one embodiment, in addition to configuring the battery pack enclosure with one or more enclosure failure ports that direct the flow of hot gas and flammable material away from the passenger compartment, one or more thermal insulators are located between the battery pack enclosure 101 and the passenger compartment. The purpose of the thermal insulation surrounding some, or all, of the battery pack enclosure is to reduce the flow of heat from enclosure 101 to the passenger compartment, thereby further protecting the passengers from harm. Additionally, in at least one embodiment thermal insulation is also interposed between the battery pack enclosure and any flammable materials located in proximity to the battery pack, thus reducing the risk of vehicle fires.

FIG. 20 illustrates an exemplary configuration in which only those portions of the battery pack enclosure 101 adjacent to the passenger compartment and/or adjacent to flammable materials are thermally insulated with thermal insulator 2001, thus allowing other enclosure surfaces such as surface 2003 to radiate heat, thereby aiding enclosure cooling. The material selected for thermal insulator 2001 as well as the selected thickness and location for this layer or layers depends on the number and type of cells within the battery pack as the expected temperature and duration of a propagating thermal runaway event depends on these factors. Additionally, the material and thickness of the thermal insulation depends on the mounting location of the battery pack and the proximity of the battery pack to the passenger compartment and/or flammable materials. In general, the maximum projected temperature of the exterior surface of the battery pack enclosure is calculated as well as the expected duration of a propagating thermal runaway event. For the thermal insulation interposed between the passenger compartment and the battery pack enclosure, this information is used along with the thermal design goals for the passenger compartment to calculate the requirements for the thermal insulation. Typically, the passenger compartment goals are given in terms of the maximum temperature allowed within the passenger compartment for the first 'x' number of minutes after the onset of a thermal event. These goals are intended to insure that passengers will be given sufficient time after a thermal event begins to safely exit the vehicle or for emergency responders to extract the passengers from the vehicle. For the thermal insulation interposed between the battery pack enclosure and flammable materials, the design goal of a preferred embodiment is to prevent the heat generated during a thermal event from initiating secondary fires of vehicle flammable materials or increasing the temperature within the passenger compartment beyond tenable levels before a predetermined length of time.

After determining the desired thermal insulation properties based both on the expected characteristics of a battery pack thermal event for the intended battery pack and on the design criteria imposed by the thermal design goals for the passenger compartment and adjacent flammable materials, then specific thermal insulators are selected. In addition to the thermal properties of the insulation, cost, ease of manufacturing, and insulation weight are also considered in selected the thermal insulator(s). It will be appreciated that there are a wide range of acceptable thermal insulators, depending upon the design goals for the material that are driven, in large part and as noted above, on the exact configuration of the battery pack, battery pack enclosure, vehicle, and enclosure mounting. In addition to thermal insulators (e.g., fiberglass; silica, titania, carbon and/or alumina based materials, etc.), it is expected that any of a variety of fire retardant materials (e.g., intumescent materials, etc.) may also be used, either as a replacement for the thermal insulation, or as an additional layer used in conjunction with the thermal insulator. The location and profile of the fire retardant materials may be the same as the thermal insulators or may be in select areas (e.g., only near the designed failure port).

Figure 21:
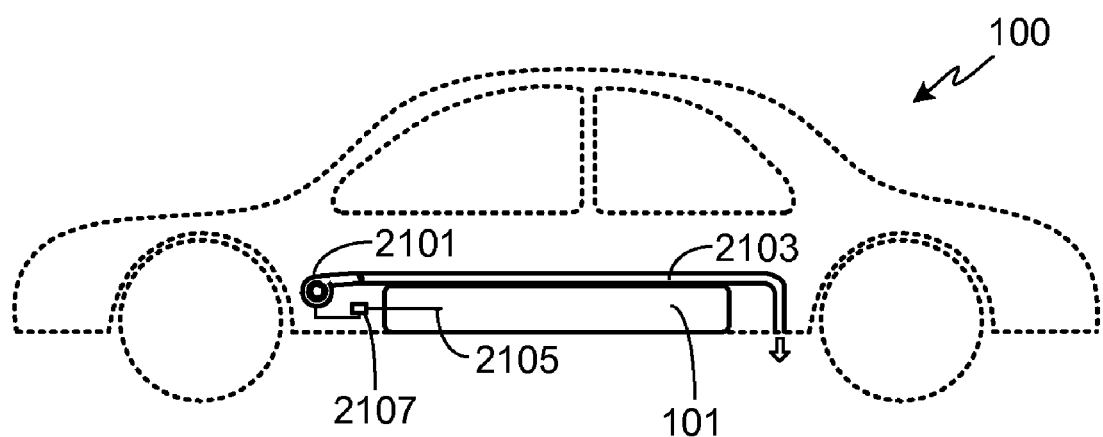
FIG. 21 illustrates an embodiment utilizing a blower fan to force air around the battery pack enclosure.

In at least one embodiment, and as illustrated in FIG. 21, a fan(s) 2101 is used to reduce the flow of thermal energy from enclosure 101 to the passenger compartment and/or regions of flammable material by directing a flow of fresh air between the enclosure and adjacent vehicle regions (e.g., passenger compartment). In one embodiment, fan 2101 has an air intake forward of the battery pack enclosure. As a result, during normal battery pack and vehicle operation and while the car is moving forward, fresh air may be being forced past the enclosure, thus drawing off heat and cooling the battery pack enclosure while simultaneously reducing the flow of heat to adjacent vehicle regions. The air from the fan/fan intake may simply be routed through a region between the passenger compartment and the battery pack, or directed through one or more heat resistant channels 2103 before being directed away from the vehicle and the passenger compartment. Preferably one or more temperature sensors 2105 detect when the battery pack enclosure temperature is above the desired operating range. Typically temperature sensors 2105 are the same sensors used to monitor battery temperature and detect the onset of thermal runaway. Once sensors 2105 detect an elevated temperature, indicating the onset of thermal runaway, an appropriate signal is sent to fan controller 2107 to initiate fan operation.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

The invention claimed is:

1. A battery pack thermal management system, comprising:
   a battery pack enclosure configured to hold a plurality of batteries, wherein said battery pack enclosure is comprised of a high temperature material; and
   an enclosure failure port assembly integrated into a wall of said battery pack enclosure, wherein said wall of said battery pack enclosure has a first wall thickness, wherein said enclosure failure port assembly remains closed during normal operation of said battery pack, and wherein said enclosure failure port assembly opens during a battery pack thermal runaway event and provides a flow path for exhausting hot gas from within said battery pack enclosure, wherein said enclosure failure port assembly directs said flow path at an angle away from a normal of said wall of said battery pack enclosure, and wherein said enclosure failure port assembly further comprises:
   a substantially circular region of said wall, said substantially circular region having a second wall thickness that is thinner than said first wall thickness;
   a transition region interposed between said substantially circular region and a surrounding portion of said wall that surrounds said substantially circular region, wherein a first portion of said transition region encircling a first portion of said substantially circular region has a third wall thickness that is thicker than said second wall thickness and thinner than said first wall thickness, wherein a second portion of said transition region encircling a second portion of said substantially circular region has a fourth wall thickness that is thinner than said second wall thickness and thinner than said first wall thickness, wherein said second portion of said transition region fails before said first portion of said transition region during said battery pack thermal runaway event and allows hot gas from within said battery pack enclosure to exhaust through said substantially circular region at an angle away from said normal of said wall of said battery pack enclosure.

2. The battery pack thermal management system of claim 1, wherein said high temperature material is comprised of a metal with a melting temperature greater than 800° C.

3. The battery pack thermal management system of claim 1, wherein said high temperature material is comprised of a metal with a melting temperature greater than 1000° C.

4. The battery pack thermal management system of claim 1, wherein said high temperature material is comprised of at least an outer layer and an inner layer, wherein said inner layer is comprised of a ceramic.

5. The battery pack thermal management system of claim 4, wherein said ceramic inner layer prevents said outer layer from melting during said battery pack thermal runaway event.

6. The battery pack thermal management system of claim 1, wherein said high temperature material is comprised of at least an outer layer and an inner layer, wherein said inner layer is comprised of an intumescent material.

7. The battery pack thermal management system of claim 6, wherein said intumescent material inner layer prevents said outer layer from melting during said battery pack thermal runaway event.

8. The battery pack thermal management system of claim 1, wherein said battery pack enclosure further comprises:
   a first housing member configured to hold said plurality of batteries;
   a second housing member configured to be coupled to said first housing member; and
   means to secure said first housing member to said second housing member.

9. The battery pack thermal management system of claim 8, wherein said battery pack enclosure further comprises a sealing gasket configured to fit between a first sealing surface corresponding to said first housing member and a second sealing surface corresponding to said second housing member, said sealing gasket further configured to be interposed between said first and second sealing surfaces when said first housing member is secured to said second housing member.

10. The battery pack thermal management system of claim 1, wherein said enclosure failure port assembly opens when an internal battery pack temperature exceeds a preset temperature.

11. The battery pack thermal management system of claim 1, wherein said enclosure failure port assembly opens when an internal battery pack temperature exceeds a preset temperature and an internal battery pack pressure exceed a preset pressure.

12. The battery pack thermal management system of claim 1, further comprising a heat resistant channel, wherein an entrance of said heat resistant channel is proximate to said enclosure failure port assembly, and wherein during said battery pack thermal runaway event hot gas is exhausted out of said enclosure failure port assembly and into said entrance of said heat resistant channel.

13. The battery pack thermal management system of claim 12, wherein said battery pack enclosure is mounted to a vehicle, wherein said hot gas exhausted through said enclosure failure port during said thermal runaway event passes through said heat resistant channel, and wherein an exit port of said heat resistant channel directs said hot gas away from a vehicle passenger compartment.

14. The battery pack thermal management system of claim 12, wherein said heat resistant channel utilizes an open channel design.

15. The battery pack thermal management system of claim 12, wherein said heat resistant channel utilizes a closed channel design.

16. The battery pack thermal management system of claim 1, wherein said battery pack enclosure is mounted to a vehicle, wherein said battery pack thermal management system further comprises at least one layer of a thermal insulator positioned between said battery pack enclosure and a vehicle passenger compartment.

17. The battery pack thermal management system of claim 1, wherein said battery pack enclosure is mounted to a vehicle, wherein said battery pack thermal management system further comprises at least one layer of a fire retardant material positioned between said battery pack enclosure and a vehicle passenger compartment.

18. The battery pack thermal management system of claim 17, wherein said fire retardant material is comprised of an intumescent material.

* * * * *